United States Patent [19]

Rome

[11] Patent Number: 4,715,091
[45] Date of Patent: Dec. 29, 1987

[54] PROCESS FOR PREPARING CLAM CUTLET

[76] Inventor: Howard M. Rome, 110 Dean St., Taunton, Mass. 02780

[21] Appl. No.: 29,448

[22] Filed: Mar. 23, 1987

[51] Int. Cl.⁴ .............................................. A22C 29/04
[52] U.S. Cl. .......................................... 17/48; 17/25; 17/52; 17/53
[58] Field of Search .................... 17/52, 25, 53, 74, 48

[56] References Cited

U.S. PATENT DOCUMENTS

| | | | |
|---|---|---|---|
| 3,964,131 | 6/1976 | Snow | 17/53 |
| 4,287,642 | 9/1981 | Jaccard et al. | 17/25 |
| 4,301,571 | 11/1981 | Blakeslee | 17/53 X |

*Primary Examiner*—Willie G. Abercrombie
*Attorney, Agent, or Firm*—James J. Ralabate

[57] ABSTRACT

A process is disclosed by which a clam is extracted from its shell, the viscera is removed from the tongue, the tongue is butterflied and thereafter passed through a conventional tenderizer.

11 Claims, 6 Drawing Figures

PROCESS FOR PREPARING CLAM CUTLET

This invention relates to the treatment of clams and, more specifically, involves a novel process for fuller utilization of the meat of the clam.

BACKGROUND OF THE INVENTION

It is known in the seafood industry to utilize clam meat including surf clams for various purposes such as fried clams, clam chowder and the like. This invention will be described in relation to the surf clam (*Spisula solidissima*) but it should be understood that all suitable clams irrespective of their specie will be included within the scope of this invention.

In general, the clam is made up of main parts or principal components referred to as muscles, tongues (or foot), straps and siphons. Of these parts, the largest meat portion (about one-half of the clam) is the foot which is usually sliced up or chopped and used for various food dishes such as clam strips or clam chowder. Heretofore, no method is known where the clam foot is used as a large or one-piece cooked food product since it is too tough and would be difficult to be easily consumed. Thus, the foot, a main portion of the clam, must be sliced or chopped or otherwise severed so as to be easily and conveniently eaten.

There are methods for preparing clams for consumption, some are described in U.S. Pat. Nos. 2,808,612; 3,230,578; 3,460,192; 3,646,638; 3,659,315; 3,964,131 and 4,279,934. In U.S. Pat. No. 2,808,612 (Snow) an apparatus is disclosed for washing and otherwise preparing the clam for consumption. The Snow patent describes generally a method for cleaning the clam by holding the clam meats in suspension during the pre-wash. The clam meats are then removed by sluicing the water containing them through a port in the side of a tank and onto a perforated tray where the wash water is drained away leaving the washed, drained clam meats ready to be cleaned. The cleaned meats, including the foot, are then subjected to a final washing and thereafter are again drained and subsequently ground, sliced or chopped ready for consumption, canning, or freezing. In the Marvin et al U.S. Pat. No. 3,230,578 an apparatus is disclosed for recovering the flesh from clams without noticeably cooking the flesh. In Marvin et al U.S. Pat. No. 3,460,192 an apparatus for removing clam flesh is disclosed wherein the clam flesh is stretched and severed as it passes through stripper bars. In Snow U.S. Pat. No. 3,646,638 a method for preparing clams for consumption is disclosed wherein a portion of the clam is selectively removed by squeezing that part from the remainder of the clam. In Finley U.S. Pat. No. 3,659,315 a method for cleaning and preparing clams for consumption is disclosed. Finley describes a method for separating the visceral material from the clam, separating it from the clam meat, washing it and then chopping or cutting the clam meat into small pieces or slices. In U.S. Pat. No. 3,964,131 to Snow a method is disclosed for removing viscera from the tongue (or foot) of the clam. Since the tongue is the main flesh portion of the clam, Snow recognizes that it is important to improve the commercial value and appearance of the tongue by ridding it of unwanted viscera. In U.S. Pat. No. 4,279,934 (Hutchinson et al) the conventional preparation of clams for consumption is described. Hutchinson teaches that in the conventional preparation of clams for consumption or canning the clams are shucked, debellied, washed and cut or sliced into suitable sized pieces.

None of these references disclose using the tongue or foot of the clam as a one-piece food product.

SUMMARY OF THE INVENTION

It is therefore an object of this invention to provide a method for preparing clams for consumption which is devoid of the above-noted disadvantages.

Another object of this invention is to provide a method for preparing clams for consumption wherein the largest flesh part is retained as a one-piece food product.

Still another object of this invention is to provide a method for preparing clams for consumption wherein the commercial value of the clam meat is enhanced.

Yet another object of this invention is to provide a method for preparing clams for consumption wherein an edible clam cutlet or larger piece than heretofore available is provided.

Yet still another object of this invention is to provide a convenient and relatively simple method for preparing novel clam food products.

The foregoing objects and others are accomplished in accordance with this invention by providing, generally speaking, a simple process for preparing clams for consumption. The clam is shucked or extracted from its shell, the viscera is discarded, the remaining meat parts are washed and separated. The tongue or foot of the clam is bisected leaving the two parts connected along the edge of the foot. After this butterflying, the new clam cutlet is passed at least once through a mechanical tenderizer such as those sold and distributed by Jaccard Corporation of Orchard Park, N.Y. and covered by U.S. Pat. Nos. 4,199,841 and 4,463,476. Any suitable mechanical meat tenderizer may be used but it must have the proper blades or incision means. Hence, for the first time, an edible and chewable one-piece clam cutlet or larger clam piece than heretofore available is provided to the customer.

The clam is conventionally extracted and cleaned by any of the methods described by the references cited above. The anatomy of the clam and its components are described in U.S. Pat. No. 3,646,638 and the other references noted above in addition to "Biological & Fisheries Data on Surf Clams Spicula Solidissima (Dillwyn)" by John W. Ropes, U.S. Department of Commerce February 1980 Woods Hole, Mass. 02543 Tech. Ser. Rep. No. 24. This publication discloses in its illustration B that the anatomy of the soft body of the clam after removal of the left valve, mantle and mantle edge comprises the kidney, foot retractor muscle, adductor muscle, gills, cut mantle edge, foot (or tongue), palps, infrabranchial chamber, epibranchial chamber, incurrent siphon and excurrent siphon. In brief, the process in accordance with this invention for using the whole foot of the surf clam as a food item is as follows:

(a) The harvested surf clam is extracted from its shell by any one of several established techniques.

(b) After extraction, the viscera is separated from the edible meat parts with the viscera being discarded and the meat parts going into a washing process to remove sand and other matter from the edibles.

(c) After the washing process, the meat parts are separated into two groups: (1) the feet and (2) the mantles, siphons and the adductor muscles.

(d) After the separating process, the feet are bisected leaving the two parts connected by a narrow part along one edge of the foot, hence "butterflying" the foot.

(e) After "butterflying" (or halfing of whole piece) the new "cutlet" is passed through a mechanical tenderizing machine with sharp incision blades and rendered chewable as a whole piece.

When the term "butterflying" is used throughout this disclosure, it is intended to include one or two-pieced tongues where the tongue is cut in half and either separated or maintained as a single piece. It is preferred, however, for optimum results to use the conventional butterflied tongue of FIG. 3.

DESCRIPTION OF THE DRAWING AND PREFERRED EMBODIMENT

Figure 1:
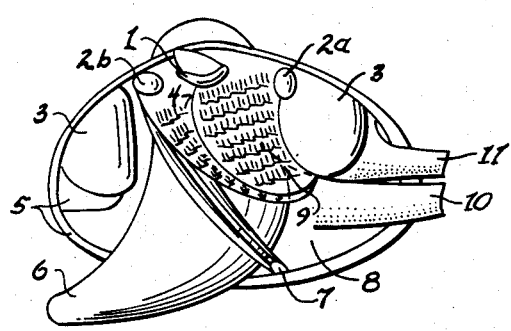
FIG. 1 is a cutaway view of the interior of a surf clam.
Figure 2:
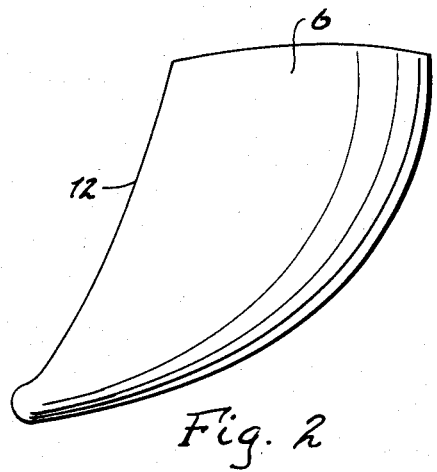
FIG. 2 is a plan view of a foot or tongue of a surf clam.
Figure 3:
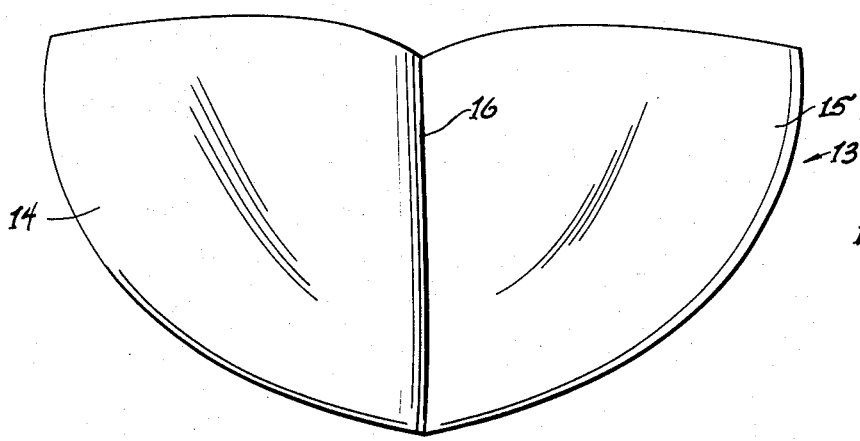
FIG. 3 is a plan view of a foot or tongue of a surf clam after it has been butterflied vertically.
Figure 4:
FIG. 4 is a plan view of a foot after it has been butterflied along its horizontal axis.
Figure 5:
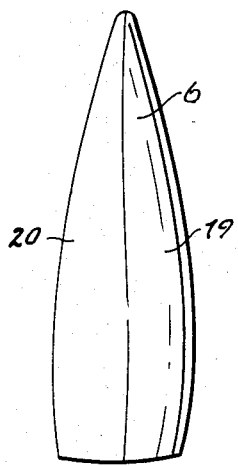
FIG. 5 is a plan view of a foot after it has been cut into two distinct pieces.

In FIG. 1 the anatomy of the soft body of the Surf Clam after removal of the left valve, mantle and mantle edge is illustrated. The kidney 1 of the clam is shown located at the upper dorsal portion of the clam. Just below kidney 1 on both sides are located foot retractor muscles 2A and 2B and below muscles 2 are located adductor muscles 3. Gills 4 are located between the adductor muscles 3 and under adductor muscles 3 is the cut mantle edge 5. All of the soft portions of the clam are removed leaving the foot 6, the adductor muscles 3, the mangle 5 and the incurrent and excurrent siphons 10 and 11 respectively. The tongue to be ultimately used can be (1) two or more portions of tongue, (2) one piece not butterflied or (3) the preferred butterflied as shown in drawing. The non-edibles are removed from over foot or tongue 6 so that foot 6 can be cleaned, separated from viscera and prepared for butterflying. Overlapping the lower central portion of tongue 6 are palps 7. To the lower right of tongue 6 is the infrabranchial chamber 8 and to the upper right of tongue 6 is located the epibranchial chamber. The incurrent siphon 10 and excurrent siphon 11 are indicated to the right of chamber 8. Once the viscera including the kidney, the palps, the intestines and other non-edible internal organs are discarded and removed, the tongue 6 is separated from the remaining flesh portions. The tongue 6 is removed to wash out sand and other debris. In FIG. 2 the tongue 6 is illustrated as it is readied for further processing. It is at this point that the prior art processes slice or chop up the tongue and also the other remaining flesh portions including the mantle 5, adductor muscles 3 and siphons 10 and 11. In the process of the present invention the tongue 6 is cut vertically along its edge 12 to butterfly as a one-piece cutlet 13. If desirable, the tongue 6 can be cut horizontally to fold upon its small edge portion. Also, if desirable, the tongue can be cut into two distinct parts or used as a single piece rather than butterfly. The butterfly cutlet 13 consists of two mirror image sections 14 and 15 connected by a focal portion 16. After butterflying, the cutlet 13 is passed into a meat tenderizer of the type manufactured and distributed by Jaccard Corporation of Orchard Park, N.Y. It is critically important that a suitable mechanical tenderizer be used since chemical tenderizers could destroy the texture and taste of the cutlet 13 and less precise tenderizers can fragment, disfigure or tear the cutlet 13. The naturally hard and tough tongue 6 is rendered chewable and tender after cooking by the butterflying and tenderizing steps of this invention. Also, with proper mechanical tenderizing, the cutlet cooking time is reduced and is not tough after cooking. The sharp incisions of the tenderizer made by razor sharp blades sever the muscle fiber and cut down on the fibrous nature of the tongue 6 to render it chewable after cooking and yet not leave any disfigurement to the flesh as a result of the tenderizing process. In FIG. 4 the cutlet 17 is shown butterflied along its connecting horizontal edge 18. In FIG. 5 the tongue 6 is cut along its longitudinal axis to make two distinct and separate pieces 19 and 20. These pieces are then tenderized by a mechanical tenderizer having sharp teeth or blades so as not to mar or tear the tongue 6.

Figure 6:
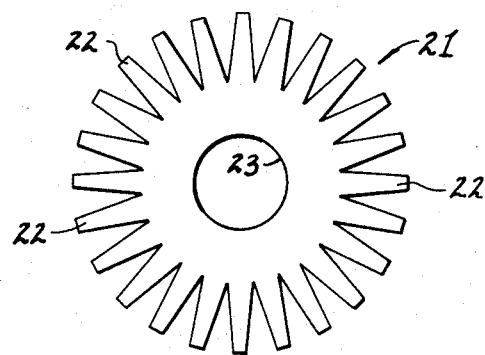
FIG. 6 is a plan view of the preferred tenderizer blade used in the present process.

As noted earlier, it is necessary that the proper mechanical tenderizer be used such as those of U.S. Pat. Nos. 4,199,841 and 4,463,476, however the preferred tenderizer blade is shown in FIG. 6. A single or multiple blade tenderizer may be used where each blade 21 has a circular configuration with very sharp teeth 22 projecting along the periphery thereof. As the clam foot 6 is passed under or between blades 22 the teeth sever the tongue meat and not only tenderize it but reduce the required cooking time and energy required to properly cook it. A series of blades 22 can be put around an axle where inner circumferential portion 23 encloses the axle. As the axle turns so does blade (or blades )21 and its teeth 22 penetrate the meat of tongue 6.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. A method for preparing a one-piece clam tongue for consumption, which comprises extracting the clam from its shell, removing the viscera from said tongue, separating the tongue from any remaining flesh, butterflying said tongue and passing it through a mechanical meat tenderizer to provide thereby a tender, edible one-piece clam cutlet.

2. The process of claim 1 wherein said tongue is washed with water prior to said butterflying step.

3. The process of claim 1 wherein said tongue is cut along one of its vertical edges to form the butterfly cutlet.

4. The process of claim 1 wherein said tongue is cut along one of its horizontal edges to form the butterfly cutlet.

5. The process of claim 1 wherein said tongue is tenderized and then subsequently butterflied.

6. The process of claim 1 wherein said tongue is butterflied first and then tenderized by a mechanical tenderizer.

7. A method for providing a one-piece clam cutlet which comprises sequentially:

(a) extracting substantially all the clam flesh from its shell;

(b) separating any viscera from any edible meat parts of the extracted clam;

(c) discarding the extracted viscera;

(d) washing the remaining meat parts of the clam to remove sand and other debris;

(e) separating the meat parts into the tongue, the mantles, the siphons and the adductor muscles;

(f) bisecting said tongue in a manner whereby the bisected pieces are connected at a folding edge, and (g) passing said tongue through a mechanical meat tenderizer.

8. The process of claim 7 wherein said tongue is washed with water prior to said butterflying step.

9. The process of claim 7 wherein said tongue is cut along one of its vertical edges to form the butterfly cutlet.

10. The process of claim 7 wherein said tongue is cut along one of its horizontal edges to form the butterfly cutlet.

11. The process of claim 7 wherein said butterflying step includes separating the butterflied portions into two separate parts.

* * * * *